(12) United States Patent
Nakata

(10) Patent No.: US 7,767,964 B2
(45) Date of Patent: Aug. 3, 2010

(54) NIGHT VISION APPARATUS

(75) Inventor: Takatoshi Nakata, Setagaya-ku (JP)

(73) Assignee: Kyocera Corporation, Kyoto (JP)

( * ) Notice: Subject to any disclaimer, the term of this patent is extended or adjusted under 35 U.S.C. 154(b) by 147 days.

(21) Appl. No.: 12/294,606

(22) PCT Filed: Mar. 26, 2007

(86) PCT No.: PCT/JP2007/056266
§ 371 (c)(1),
(2), (4) Date: Sep. 25, 2008

(87) PCT Pub. No.: WO2007/111317
PCT Pub. Date: Oct. 4, 2007

(65) Prior Publication Data
US 2009/0101820 A1    Apr. 23, 2009

(30) Foreign Application Priority Data
Mar. 28, 2006    (JP) .............................. 2006-087805

(51) Int. Cl.
H01L 31/00    (2006.01)
(52) U.S. Cl. ...................................................... 250/330
(58) Field of Classification Search .................. 250/330
See application file for complete search history.

(56) References Cited

U.S. PATENT DOCUMENTS

| | | | |
|---|---|---|---|
| 6,861,809 B2 | 3/2005 | Stam | |
| 7,081,991 B2 | 7/2006 | Jones et al. | |
| 2003/0107323 A1 | 6/2003 | Stam | |
| 2003/0160153 A1 | 8/2003 | Hara et al. | 250/214 VT |
| 2003/0202358 A1* | 10/2003 | Albou et al. | 362/510 |
| 2004/0179283 A1 | 9/2004 | Jones et al. | |
| 2005/0023465 A1 | 2/2005 | Eggers et al. | |
| 2007/0278406 A1 | 12/2007 | Haug | |

FOREIGN PATENT DOCUMENTS

| | | |
|---|---|---|
| JP | 56135809 A | 10/1981 |
| JP | 10-108206 | 4/1998 |
| JP | 2002-320139 | 10/2002 |
| JP | 2003-259363 | 9/2003 |
| JP | 2004-032243 | 1/2004 |
| JP | 2004-142561 | 5/2004 |
| JP | 2005-032625 A * | 2/2005 |
| WO | 2005066684 A1 | 7/2005 |

* cited by examiner

OTHER PUBLICATIONS

European search report for corresponding European application 07739704.0 lists the references above, Apr. 2009.

Primary Examiner—David P Porta
Assistant Examiner—Kiho Kim
(74) Attorney, Agent, or Firm—Hogan Lovells US LLP

(57) ABSTRACT

A night visional apparatus is provided that can assist in enlarging the field of view at night or in bad weather, and can obtain image with high sensitivity over a range from a vicinity of the apparatus to a distant area. The night vision apparatus includes a headlamp having one or two or more light sources, to emit light ranging from a visible light region to an infrared light region, a plurality of peaks exiting in a wavelength spectrum in the visible light region; an imaging camera that received light emitted from the illuminating device; and an optical band elimination filter that blocks only a part of peaks among the plurality of peaks. An output image is obtained based on an image captured by the imaging camera through the optical band elimination filter.

10 Claims, 6 Drawing Sheets

NIGHT VISION APPARATUS

CROSS-REFERENCE TO RELATED APPLICATIONS

This application is a national stage of international application No. PCT/JP2007/056266, filed on Mar. 26, 2007, and claims the benefit of priority under 35 USC 119 of Japanese Patent Application No. 2006-087805, filed on Mar. 28, 2006, which are incorporated herein by reference.

TECHNICAL FIELD

The present invention relates to a night vision apparatus, and in particular relates to a night vision apparatus suitable as a night vision apparatus for a vehicle, that improves the field of view at night or the like using light ranging from the visible light region to the infrared light region.

BACKGROUND ART

Conventionally, for the purpose of assisting the visibility when driving at night, a night vision apparatus for a vehicle is known in which light is irradiated using an illuminating device such as a headlamp that emits visible light and infrared light in a traveling direction such as the forward direction of the vehicle, an image of light reflected from a subject is captured using an imaging element of a camera, and the image is displayed on a monitor inside the vehicle.

For example, Japanese Unexamined Patent Publication JP-A 2004-142561 discloses a configuration in which with respect to a light source that emits light having a wavelength ranging from the ultraviolet light region to the infrared light region, two filters are used to absorb light in the visible light region (380 to 780 nm) and to pass light in the infrared light region (780 nm or more), so that an image that is not be tinged with red can be displayed using infrared transmission light, and the field of view at night or in bad weather can be enlarged without dazzling a driver of an oncoming vehicle.

Furthermore, Japanese Unexamined Patent Publication JP-A 2003-259363 discloses a method for making an obstacle such as a pedestrian hidden in halation more visible, by reducing halation in an image, by performing data processing to lower the brightness of a high intensity portion that causes halation so that halation from a high intensity light source does not occur.

Moreover, in these night vision apparatuses, a night vision apparatus for a vehicle is being developed in which infrared light is used for capturing information on a distant area that is not visible, visible light is used for capturing information on the vicinity of the vehicle, and both pieces of information are displayed on a display inside the vehicle.

However, in a case where light throughout the entire visible light region is absorbed as in JP-A 2004-142561, an image displayed is based on only infrared transmission light. Thus, when displaying an image around the vehicle based on signals of the visible light region, for example, when detecting an obstacle such as a pedestrian who is present near the vehicle or when recognizing a white line, the sensitivity of an image is lowered. Accordingly, there is the problem that an obstacle such as a pedestrian around the vehicle cannot be recognized, or a white line drawn near the vehicle cannot be confirmed. Furthermore, with a method for lowering the brightness of a high intensity portion that causes halation as in JP-A 2003-259363, the brightness is lowered over the entire visible light region, because the peak wavelength of a light source causing halation exists over the entire visible light region as shown in FIGS. 4A and 4B. Thus, it cannot be said that an obstacle around the vehicle and a white line can be sufficiently confirmed.

DISCLOSURE OF INVENTION

The invention has been made in order to solve the problems described above, and it is an object thereof to provide a night vision apparatus that can assist in enlarging the field of view at night or in bad weather, and can obtain image with high sensitivity over a range from a distant area to an area close to the apparatus by receiving light ranging from the visible light region to the infrared light region.

The invention is directed to a night vision apparatus, comprising:

an illuminating device having one light source or two or more light sources, to emit light ranging from a visible light region to an infrared light region, a plurality of peaks existing in a wavelength spectrum in the visible light region;

an imaging camera that receives light emitted from the illuminating device; and an optical band elimination filter that blocks only a part of peaks among the plurality of peaks, wherein an output image is obtained based on an image captured by the imaging camera through the optical band elimination filter.

Herein, it is preferable that a number of the peaks is at least three, and the optical band elimination filter cuts only a peak having a highest intensity among the at least three peaks. Furthermore, it is preferable that a number of the peaks is at least three, and the optical band elimination filter cuts only a peak having a highest intensity and a peak having a second highest intensity among the at least three peaks.

Furthermore, it is preferable that in a case where the light source is a high intensity discharge lamp (HID illumination light source), a light-blocking band of the optical band elimination filter has a half maximum of a blocking ratio in a wavelength band of 490 to 570 nm, or 530 to 610 nm.

Furthermore, it is preferable that a light-blocking band width of the optical band elimination filter is 50 to 100 nm.

Furthermore, it is preferable that the optical band elimination filter has two light-blocking bands that differ in cutoff wavelength, which is a wavelength at which a blocking ratio is a half maximum.

Furthermore, the invention is directed to a vehicle equipped with a night vision apparatus, in which the night vision apparatus described above is equipped.

Furthermore, the invention is directed to a small boat equipped with a night vision apparatus, in which the night vision apparatus described above is equipped.

According to the invention, with respect to the illuminating device that emits light ranging from a visible light region to an infrared light region, the optical band elimination filter is used that cuts only a part of peaks among a plurality of peaks in the visible light region. Thus, it is possible to achieve balance of the peak intensity in the visible light region with that in the infrared light region while keeping the peak sensitivity in the visible light region. Accordingly, it is possible to obtain, with high sensitivity, both a distant image based on the peak intensity in the infrared light region and an image near the apparatus based on the peak intensity in the visible light region. Furthermore, when the optical band elimination filter is used, no halation is caused in the night vision apparatus by visible light that is emitted from the outside such as a low beam of an oncoming vehicle. Thus, it is possible to suppress an obstacle's (e.g., a pedestrian) becoming less visible around the vehicle that is equipped with the night vision apparatus of the invention. Accordingly, an output image necessary for display on the image display portion and the like becomes clear over a range from an area closer to the apparatus to a distant area, and thus the field of view of the night vision apparatus is enlarged.

The peak intensity of light in the visible light region emitted from a low beam received by the imaging camera tends to be higher than that of light in the infrared light region, because objects to be detected are closer to the vehicle in the case of the low beam. Conversely, the intensity of light received from the infrared light source tends to be lower. The detail of the wavelength spectrum of light that is emitted from the low-beam light source of a headlamp shows that there are several high intensity peaks throughout the entire wavelength of the visible light region, and information on the vicinity of the vehicle can be obtained from a low beam based on the peak intensity.

In the invention, the peak intensity of the wavelength at which peaks exist is cut or reduced not on all high intensity peaks from the low-beam light source, but on only a part of peaks among high intensity peaks that cause high intensity increasing the image peak intensity. Thus, it is possible to achieve balance between the image sensitivity in the visible light region and the image sensitivity in the infrared light region, and thus to clearly confirm information in a wide region ranging from the vicinity of the vehicle to a distant area.

Herein, it is preferable that the number of the peaks is at least three, and the optical band elimination filter cuts only a peak having the highest intensity among the at least three peaks, or only a peak having the highest intensity and a peak having the second highest intensity among the at least three peaks, because this configuration makes it possible to achieve balance of the image intensity in the visible light region with that in the infrared light region while keeping the image sensitivity in the visible light region.

Furthermore, it is preferable that in a case where the light source is a high intensity discharge lamp (HID illumination light source), a light-blocking band of the optical band elimination filter has a half maximum of a blocking ratio in a wavelength band of 490 to 570 nm, or 530 to 610 nm, because this configuration makes it possible to achieve matching of the image intensity in the visible light region with that in the infrared light region while keeping the sensitivity in the visible light region.

Furthermore, it is preferable that a light-blocking band width of the optical band elimination filter is 50 to 100 nm, because this configuration does not reduce the sensitivity in the visible light region.

Furthermore, the optical band elimination filter has two light-blocking bands that differ in cutoff wavelength, which is a wavelength at which a blocking ratio is a half maximum, so that this configuration makes it possible to cut peaks in two light-blocking bands.

Furthermore, in a case where a vehicle is equipped with the night vision apparatus of the invention, it is possible to let the driver visually confirm directly image information obtained by the night vision apparatus, to give, by means of sounds, light, or vibrations, the driver warning to the effect that an obstacle, another vehicle, or the like on the road is detected, for example, and to control a movement of the vehicle based on image information obtained by the night vision apparatus.

Furthermore, in a case where a small boat is equipped with the night vision apparatus of the invention, it is possible to let the operator visually confirm directly image information obtained by the night vision apparatus, and to give, by means of sounds, light, or vibrations, the operator warning to the effect that an obstacle such as a sunken rock, another boat, another small boat, or the like is detected, for example.

BRIEF DESCRIPTION OF DRAWINGS

Other and further objects, features, and advantages of the invention will be more explicit from the following detailed description taken with reference to the drawings.

BEST MODE FOR CARRYING OUT THE INVENTION

Figure 1A:
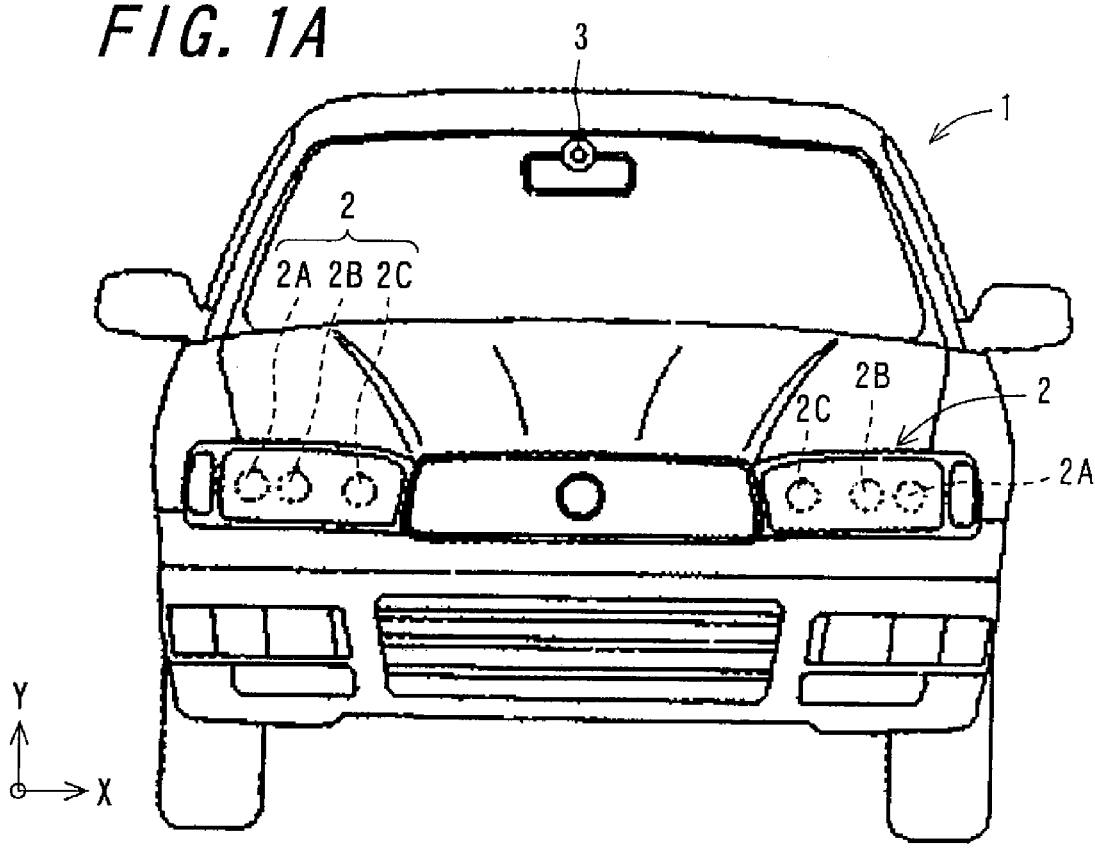
FIG. 1A is a schematic front view of a vehicle equipped with a night vision apparatus for a vehicle which is a preferable example of a night vision apparatus according to the invention.

Now referring to the drawings, preferred embodiments of the invention are described below.

Figure 1B:
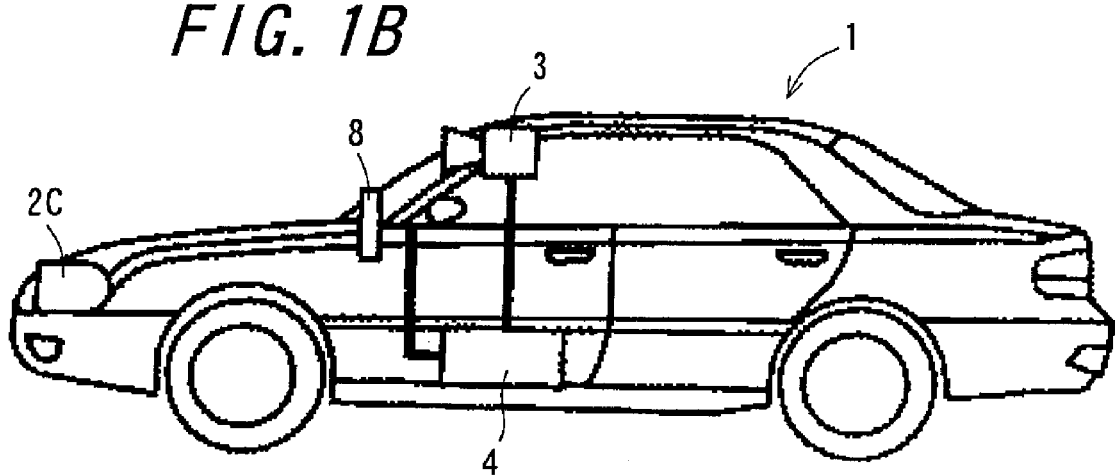
FIG. 1B is a schematic side view of the vehicle equipped with the night vision apparatus for a vehicle.

FIGS. 1A and 1B show an exemplary vehicle 1 equipped with a night vision apparatus for a vehicle, as a preferable example of a night vision apparatus according to the invention. FIG. 1A is a schematic front view. FIG. 1B is a schematic side view.

According to FIGS. 1A and 1B, headlamps 2 are arranged as illuminating devices in the front portion of the vehicle 1. The headlamps 2 are constituted by high-beam light sources 2A, low-beam light sources 2B, and infrared light sources 2C. The infrared light sources 2C are arranged on the center side of the vehicle.

Figure 2:
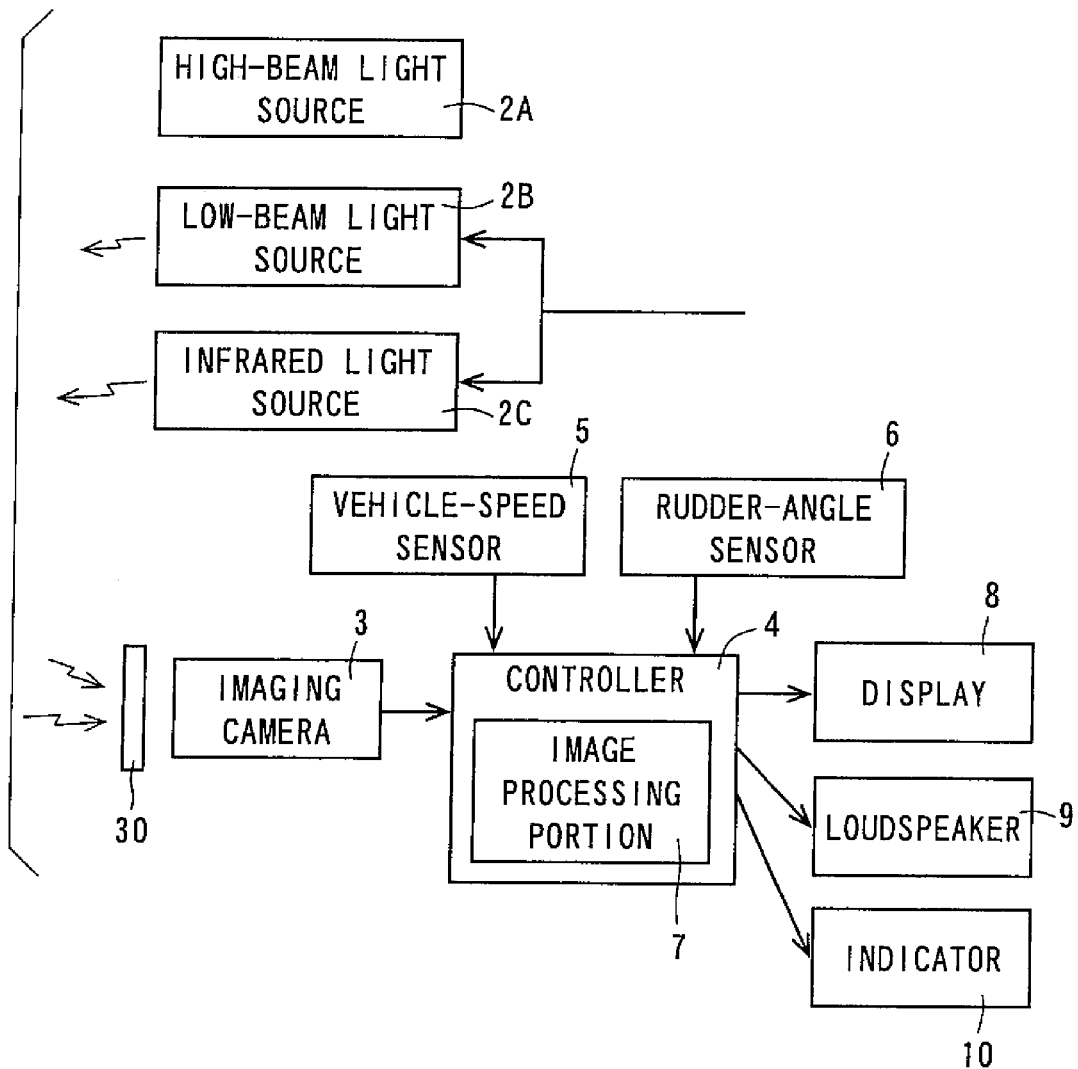
FIG. 2 is a block circuit diagram of the night vision apparatus for a vehicle with which the vehicle in FIGS. 1A and 1B is equipped.

Furthermore, as shown in FIGS. 1A and 1B, an imaging camera 3 having a sensitivity over a range from the visible light region to the infrared light region is disposed at a rear-view mirror portion in the front portion of the driver's seat inside the vehicle 1. That is to say, the imaging camera 3 detects light over a range from the visible light region to the infrared light region. A controller 4 is disposed inside the vehicle. As shown in FIG. 2, a vehicle-speed signal from a vehicle-speed sensor 5, a rudder-angle signal from a rudder-angle sensor 6, and an image signal from the imaging camera 3 are inputted to the controller 4.

The controller 4 has an image processing portion 7. The image processing portion 7 processes an image signal from the imaging camera 3, and outputs the processed signal to a display 8 functioning as an image display portion that is installed in the front portion of the driver's seat inside the vehicle 1. Thus, an image based on video captured by the imaging camera 3 is displayed on the display 8. Furthermore, the controller 4 has a function of changing the orientation of the imaging camera 3 based on a vehicle-speed signal from the vehicle-speed sensor 5 and a rudder-angle signal from the rudder-angle sensor 6. The controller 4 can also send a signal as appropriate to warning notification means such as a loudspeaker 9 or an indicator 10, for example, in a case where an obstacle such as a pedestrian exists in front of the vehicle.

In FIG. 2, an example is shown in which an output image is outputted to the display 8 functioning as an image display portion. However, the invention is not limited to this example. The output image can be outputted not only to the image display portion, but also to a vehicle control system or to a storage apparatus installed in the vehicle. Also, the output image can be transmitted to a transmission system such as a navigation system.

Figure 3A:
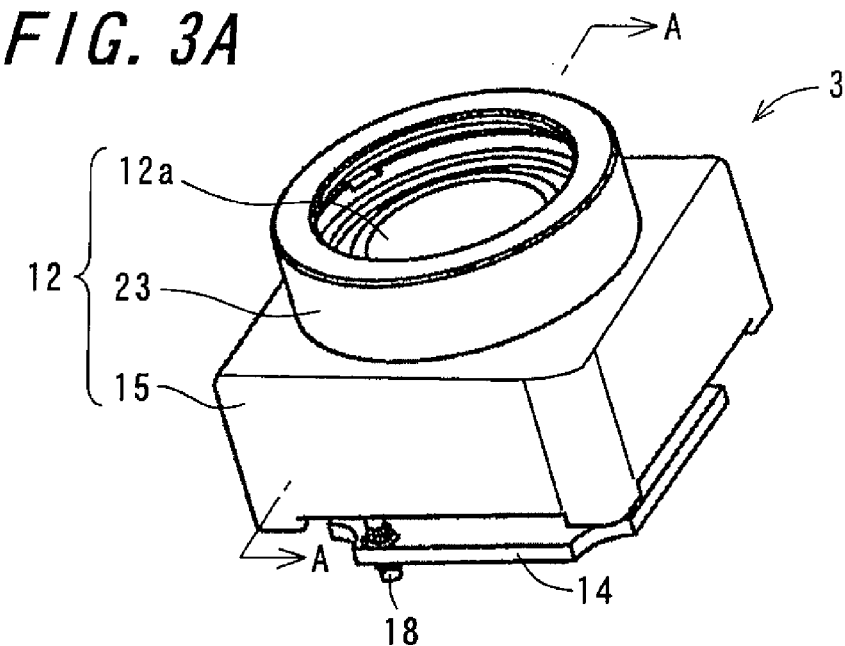
FIG. 3A is a cross sectional view showing an example of infrared light sources according to the invention and FIG. 3B is an exploded perspective view thereof.
Figure 3B:
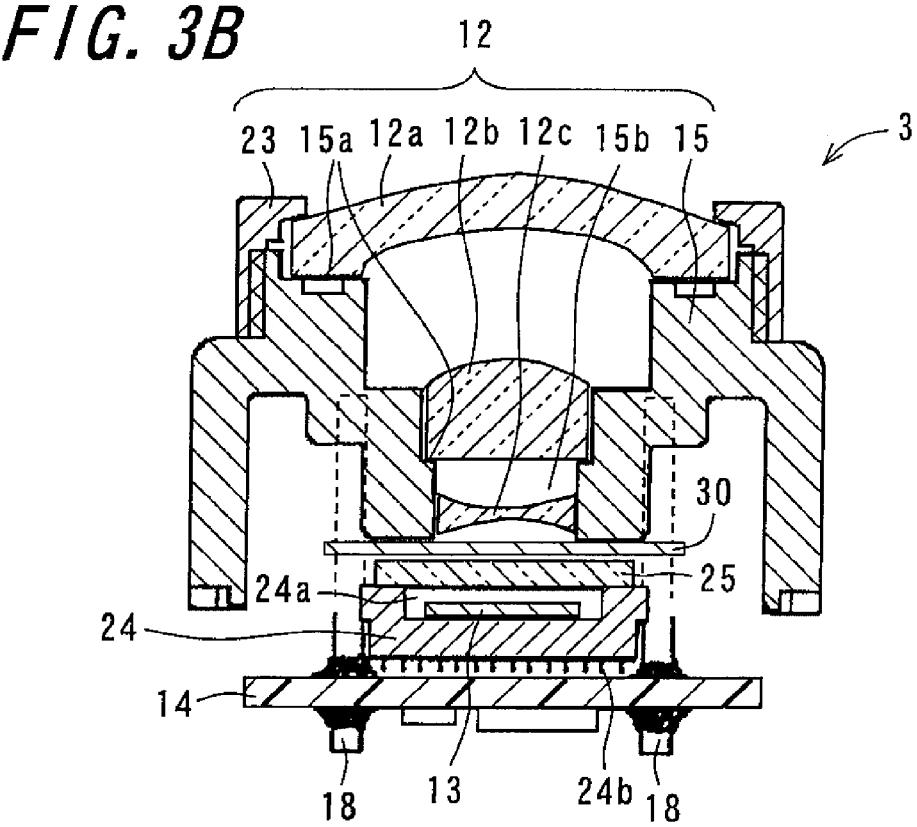

FIG. 3A shows a schematic perspective view of the detail of the imaging camera 3. FIG. 3B shows a cross-sectional view taken along line A-A in FIG. 3A. The imaging camera 3 includes a lens member 12 (a first lens 12a, a second lens 12b, and a third lens 12c) that mainly condenses light from a subject, an imaging element 13 on which an image of light from the lens member 12 is formed and converted into an electric signal, and an imaging substrate 14 on which the imaging element 13 is mounted. The lens member 12 and the imaging substrate 14 are overlaid with a predetermined gap interposed therebetween, and fixed with fixing pins 18. The first lens 12a is in contact with a face of a lens holding portion 15a of a front case 15 on the side of a subject, and pressed by a retainer 23 from the side of a subject.

The retainer 23 is fixed on the side face of the lens holding portion 15a, for example, with an adhesive or a solder. The second lens 12b and the third lens 12c are press-fitted into an opening portion 15b that is open in the lens holding portion 15a, and fixed, for example, with an adhesive or a solder. A mask or an aperture may be provided at an appropriate position of the lens member 12, or the outer circumference of the first lens 12a may be fixed by the lens holding portion 15a as the second lens 12b and the like.

The imaging element 13 is constituted by, for example, a CCD (charge coupled device) image sensor, or a CMOS (complementary MOS) image sensor. The imaging element 13 is accommodated in a cavity 24a of a sub-substrate 24, and sealed by a glass rid 25. On a face of the imaging substrate 14 opposite to the side of the imaging element 13, electronic components (not shown), such as an IC, a capacitor, a coil, and a resistor, for processing an electric signal from the imaging element 13, a connector (not shown) for connecting a cable (not shown) that connects the imaging substrate 14 and an ECU (not shown), and the like are arranged. The cable connected to the connector (not shown) is connected to an external connector that is inserted into and fixed at a back face case (not shown), and further extended to an external cable.

The invention is significantly characterized in that an optical band elimination filter 30 is disposed in a portion from the lens member 12 to the imaging substrate 14 of the imaging camera 3. In FIGS. 3A and 3B, the optical band elimination filter 30 is formed between the lens member 12 and the imaging substrate 14. However, the invention is not limited to this, and the outer circumference of the first lens 12a may be formed between lenses such as the second lens 12b or in front of the lens member 12.

More specifically, in the optical band elimination filter 30, a filter layer is formed on one main face of a flat plate made of glass. As the glass material used for the flat plate, borosilicate glass can be used in which silica is 10%, boron oxide is 10%, barium oxide is 2%, antimony oxide is 2%, titanium oxide is 2%, and zinc oxide is 20%. The optical band elimination filter is configured such that on one main face of the borosilicate glass flat plate, sequentially are formed one layer of aluminum oxide (thickness 58 nm), five layers, each consisting of titanium oxide (thickness 83 nm) and silica (thickness 130 nm), in which the titanium oxide and the silica alternate, one layer of titanium oxide (thickness 83 nm), and one layer of aluminum oxide (thickness 58 nm). When the wavelength at which the blocking ratio is a half maximum at both ends of a light-blocking band is taken as a cutoff wavelength, this optical band elimination filter has an optical property in which the light-blocking band has a center wavelength of 570 nm, and cutoff wavelengths at both ends of 530 nm and 610 nm respectively.

The optical band elimination filter described above has the configuration in which the filter layer is formed only on one main face of the flat plate. However, the configuration is not limited to this, and the filter layer may be formed on both main faces of the flat plate. In this case, for example, the filter layer that is formed on one main face is configured such that the light-blocking band has cutoff wavelengths of 530 nm and 580 nm, and the filter layer that is formed on the other main face is configured such that the light-blocking band has cutoff wavelengths of 560 nm and 610 nm. Thus, an optical band elimination filter is obtained that has an optical property in which the light-blocking band has cutoff wavelengths at both ends of 530 nm and 610 nm respectively for light passing from one main face to the other main face.

Furthermore, the optical band elimination filter also can be configured by forming a filter layer on a main face of the first lens 12a, the second lens 12b, or the third lens 12c. The optical band elimination filter also can be configured by forming a filter layer on a main face of the glass rid 25 that is attached on the upper face of the sub-substrate 24 so as to seal the imaging element 13, or by forming a filter layer on a surface of a microlens (not shown) on the surface of the imaging element 13.

Figure 4A:
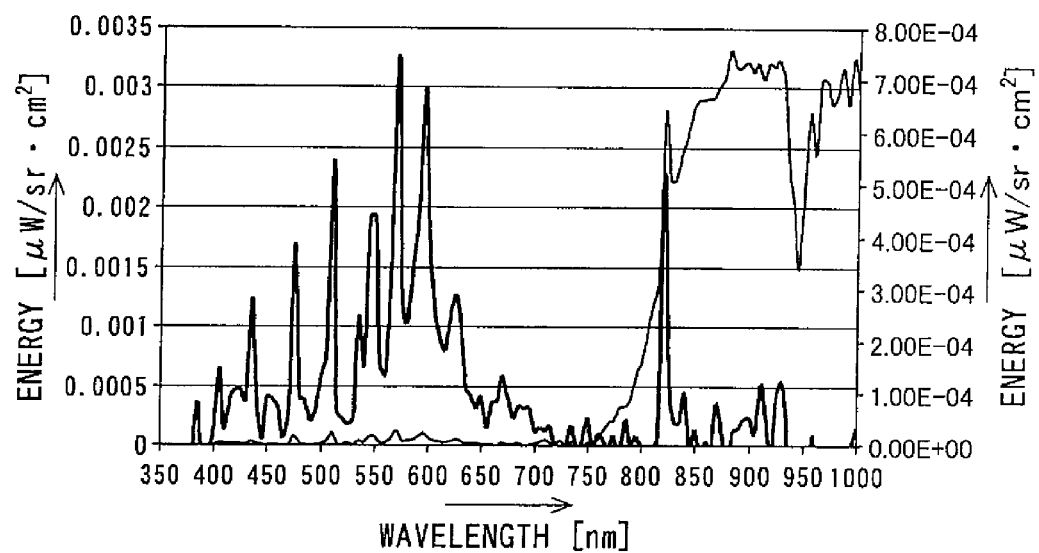
FIG. 4A is a wavelength spectrum showing a light-emitting property of an HID lamp.
Figure 4B:
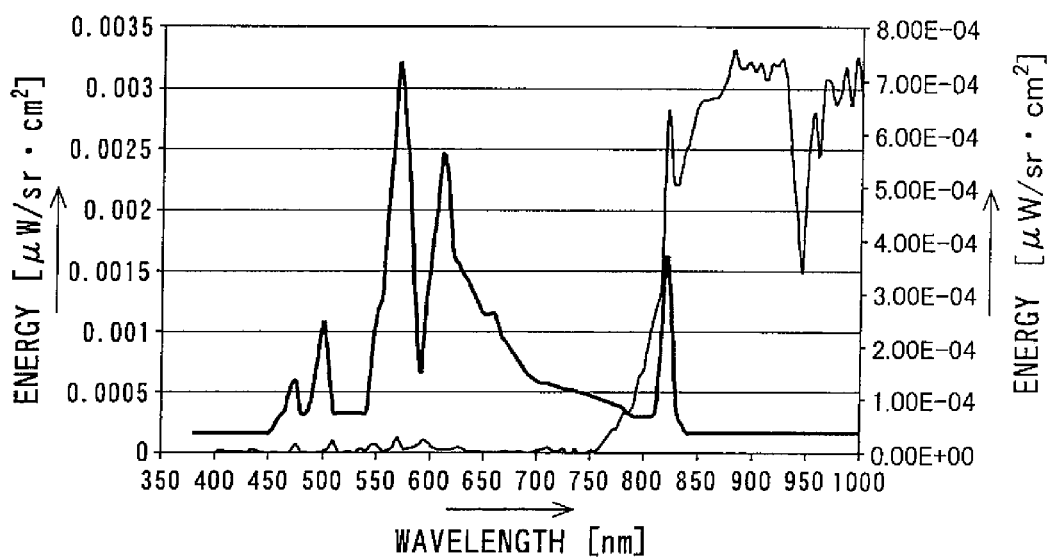
FIG. 4B is a wavelength spectrum showing a light-emitting property of another HID lamp.

FIGS. 4A and 4B show an exemplary spectrum of light that is emitted from the headlamps 2 and received by the imaging camera 3. As shown in FIGS. 4A and 4B, the imaging camera 3 receives both a spectrum of reflected light that has a plurality of peaks mainly in the visible light region (380 to 780 nm), is emitted from the low-beam light sources 2B for obtaining information on the vicinity of the vehicle when recognizing a white line or the like, and is reflected by an object, and a spectrum of reflected light that has peaks in the infrared light region (780 nm or more), is emitted from the infrared light sources 2C for obtaining information on a distant area that is not visible at night, and is reflected by an object. Although unable to be shown, the intensity of reflected light that is received by the imaging camera 3 is not determined only based on the intensity of light that is emitted from a light source, but depends also on the distance between the light source and an object. More specifically, the intensity is lowered as the distance between the light source and the object increases. Thus, the sensitivity to the light from the infrared light sources 2C for viewing a distant object tends to be lower than that to the light from the low-beam light sources 2B for viewing an object around the vehicle.

Here, in both FIGS. 4A and 4B, both a spectrum of a high intensity discharge lamp (HID illumination light source) used as the low-beam light sources 2B and a spectrum of a halogen lamp used as the infrared light sources 2C are received. In the case of light from an HID illumination light source, the waveform of a spectrum varies depending on the type of the light source. FIG. 4A shows an example of a metal halide lamp in which there are eight peaks in the visible light region. FIG. 4B shows an example of a mercury lamp in which there are four peaks in the visible light region.

Figure 5:
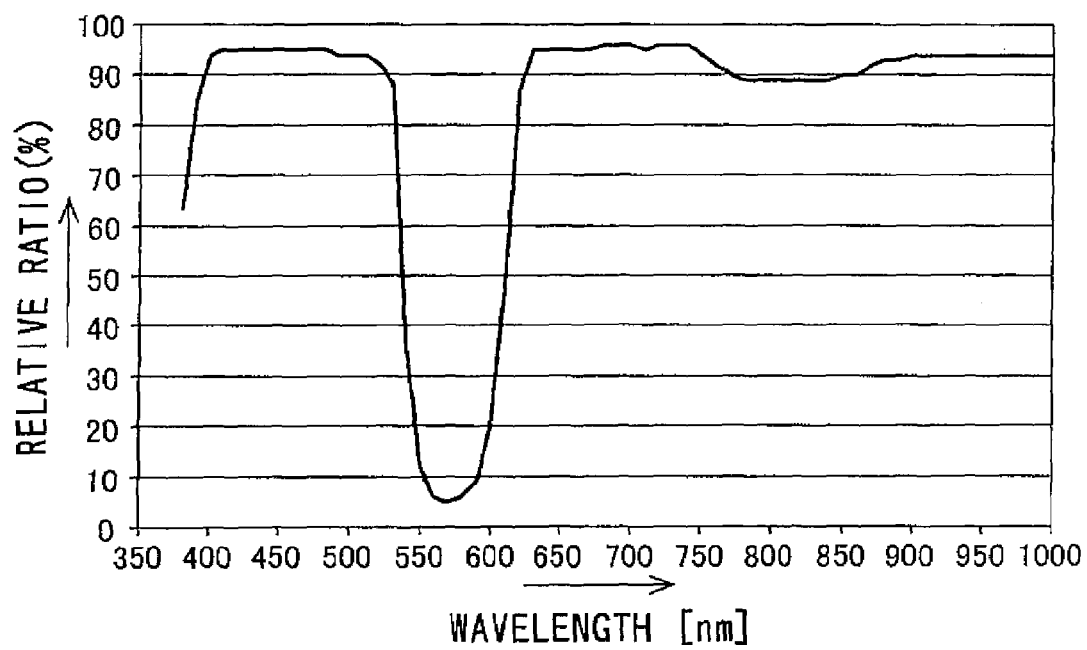
FIG. 5 is a wavelength spectrum showing an example of transmission property of an optical band elimination filter.

According to FIGS. 3A and 3B, the optical band elimination filter 30 is disposed between the lens member 12 and the imaging element 13. FIG. 5 shows an example of the transmission property of the optical band elimination filter 30. The optical band elimination filter 30 in FIG. 5 has a half maximum d of the blocking ratio in 530 to 610 nm in the light-blocking band.

Figure 6A:
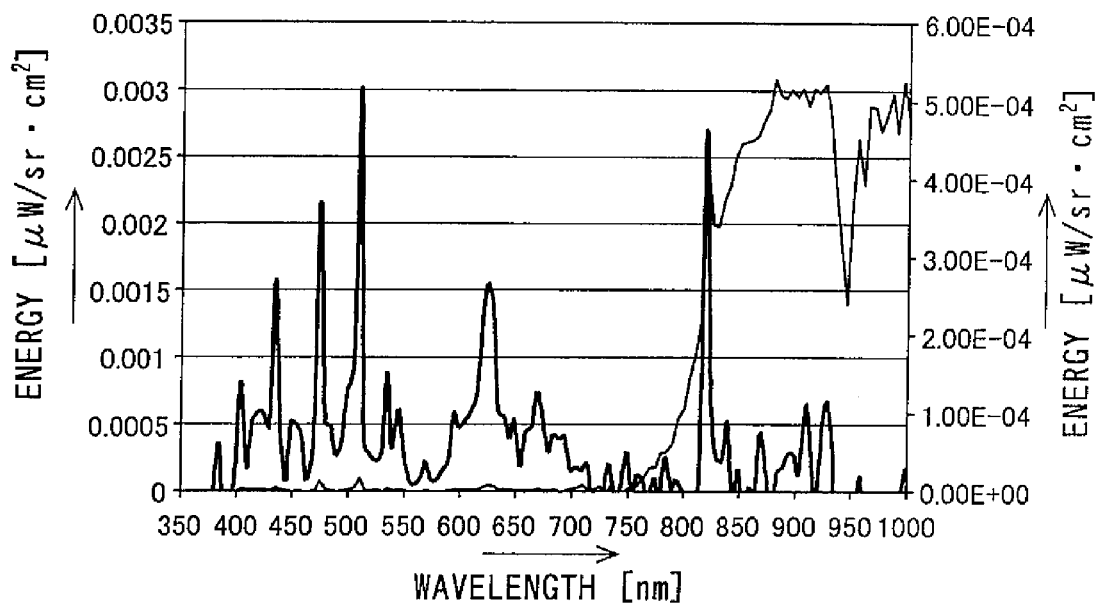
FIG. 6A is a wavelength spectrum of corrected light obtained by letting light of the HID lamp in FIG. 4A pass through the optical band elimination filter having the transmission property in FIG. 5.
Figure 6B:
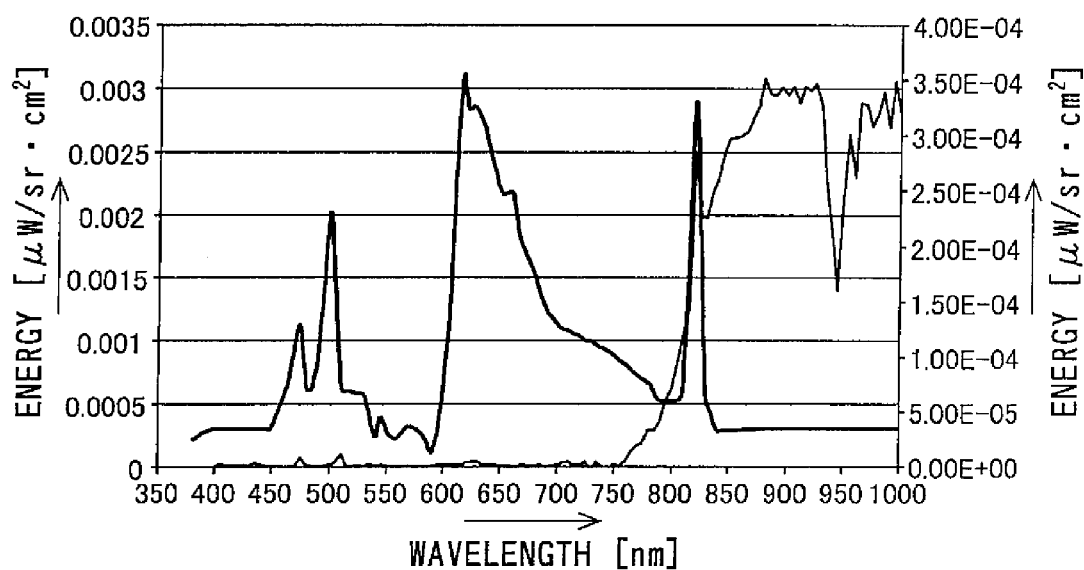
FIG. 6B is a wavelength spectrum of corrected light obtained by letting light of the HID lamp in FIG. 4B pass through the optical band elimination filter having the transmission property in FIG. 5.

When light in FIGS. 4A and 4B received by the imaging camera 3 is passed through the optical band elimination filter 30 in FIG. 5, among peaks (eight peaks in FIG. 4A, and four peaks in FIG. 4*2*) in the wavelength spectra received by the imaging camera 3, only a part of the peaks (two peaks in FIG. 4A, and one peak in FIG. 4B) is cut in such a manner that the energy intensity is $1.0 \times 10^{-5}$ µW/sr·cm$^2$ or less. Accordingly, the wavelength spectra are converted into those as shown in FIGS. 6A and 6B, and displayed on the display 8.

As a result, it is possible to adjust light of the headlamps 2, with respect to the image intensity in the infrared light region, while securing the image sensitivity in the visible light region. Thus, a clear image with high sensitivity can be displayed over a range from the visible light region to the infrared light region.

More specifically, in a case where the optical band elimination filter 30 is not used, or in a case where no peak can be cut, the image intensity of information on the vicinity of the apparatus based on light that is emitted from the low-beam light sources 2B increases, and thus an image of information on a distant area based on light that is emitted from the infrared light sources 2C becomes relatively less visible. In a case where all peaks that exist in the visible light region are cut by a filter, detection of an obstacle around the vehicle and recognition of a white line, which otherwise would be displayed based on a signal in the visible light region, cannot be performed.

Here, as shown in FIG. 5, in a case where there are five or more peaks in the wavelength spectrum of the headlamps 2, the optical band elimination filter 30 preferably cuts only two peaks, namely the peak having the highest intensity and the peak having the second highest intensity, among the five or more peaks, because this processing makes it possible to reduce the peaks so as to achieve matching of the intensity in the visible light region with that in the infrared light region while keeping the sensitivity in the visible light region.

High intensity discharge lamps (HID illumination light sources) have various wavelength spectra that vary depending on the type of the light sources, as shown in FIGS. 4A and 4B. In view of the wavelength spectrum of a high intensity discharge lamp (HID illumination light source) that is generally used as the low-beam light sources 2B, the light-blocking band of the optical band elimination filter 30 preferably has a half maximum d of the blocking ratio in 490 to 570 nm, or 530 to 610 nm in the light-blocking band, because this configuration makes it possible to effectively achieve balance of the image intensity in the visible light region with that in the infrared light region while keeping the sensitivity in the visible light region. Furthermore, the light-blocking band width of the optical band elimination filter 30 is preferably 50 to 100 nm, because this band width increases the sensitivity of an image in the visible light region.

In this embodiment, a configuration is adopted in which the infrared light sources 2C are provided as dedicated light sources that are different from the low-beam light sources 2B, but a configuration also may be adopted in which the infrared light sources 2C are used also as the low-beam light sources 2B. Furthermore, the shape of the filter of the infrared light sources 2C is not limited to those described above.

The night vision apparatus of the invention is not limited to a night vision apparatus for a vehicle, and can be also applied to a monitoring camera and the like appropriately.

The night vision apparatus of the invention can be equipped in a vehicle. A vehicle equipped with the night vision apparatus of the invention can let the driver visually confirm directly image information obtained by the night vision apparatus, can give, by means of sounds, light, or vibrations, the driver warning to the effect that an obstacle, another vehicle, or the like on the road is detected, for example, and can control a movement of the vehicle based on image information obtained by the night vision apparatus, as in vehicles equipped with conventional night vision apparatuses.

The vehicle equipped with the night vision apparatus of the invention can be realized by equipping a vehicle with the night vision apparatus of the invention, specific examples of the vehicle including not only railroad trains, electric railcars, automobiles, and other passenger vehicles, and freight cars, but also bicycles, motorized bicycles, rides in theme-parks, and carts in golf courses, for example.

Moreover, the night vision apparatus of the invention can be equipped in a small boat. A small boat equipped with the night vision apparatus of the invention can let the operator visually confirm directly image information obtained by the night vision apparatus, and can give, by means of sounds, light, or vibrations, the operator warning to the effect that an obstacle such as a sunken rock, another boat, another small boat, or the like is detected, for example, as in conventional cases.

The small boat equipped with the night vision apparatus of the invention can be realized by equipping a small boat with the night vision apparatus of the invention, specific examples of the small boat including boats that can be operated with a license for small boats or without a license, such as hand rowing boats, dinghies, wet bikes, small bass boats equipped with an outboard motor, inflatable boats (rubber dinghies) equipped with an outboard motor, fishing ships, leisure fishing boats, workboats, houseboats, towing boats, sports boats, fishing boats, yachts, offshore yachts, and cruisers, which have a gross tonnage of less than 20 tons, and pleasure boats having a gross tonnage of 20 tons or more.

Example

A vehicle was prepared that had headlamps as light sources with the light-emitting property shown in FIGS. 6A and 6B and in which an optical band elimination filter with the light-blocking band in Table 1 was disposed inside an imaging camera. At night, this vehicle was stopped on a road with a white line drawn on the left side, and a person in white clothes was made to stand as an obstacle near the white line. Both the low-beam light sources and the infrared light sources of the vehicle were on. At that time, it was checked whether or not the existence of the person in white clothes was able to be confirmed when the operator was sitting in the driver's seat of the vehicle and used a display of the night vision apparatus of the vehicle to observe an oncoming vehicle positioned in front of the vehicle with a space of 150 m interposed therebetween in a state where the headlamps of the oncoming vehicle were on.

Furthermore, in a case where the operator was sitting in the driver's seat of this vehicle, and both the low-beam light sources and the infrared light sources of the vehicle were on, an image outputted to the display of the night vision apparatus in the vehicle was confirmed and evaluated to determine whether or not the left white line was able to be confirmed in the image. Table 1 shows the results. Sample 3 corresponds to light of a high intensity discharge lamp (HID illumination light source 1: HID1) received with the wavelength spectrum in FIG. 4A, and passed through the optical band elimination filter in FIG. 5 to be corrected to have the wavelength spectrum in FIG. 6A. Sample 4 corresponds to light of a high intensity discharge lamp (HID illumination light source 2: HID2) received with the wavelength spectrum in FIG. 4B, and passed through the optical band elimination filter in FIG. 5 to be corrected to have the wavelength spectrum in FIG. 6B.

TABLE 1

| Sample No. | Type of headlamp | Number of peaks in light source | Filter blocking band | Number of cut peaks | Recognition of obstacle | Confirmation of white line |
|---|---|---|---|---|---|---|
| *1 | HID1 | 8 | 380-780 | 8 | Excellent | Disable |
| 2 | HID1 | 8 | 490-610 | 4 | Excellent | Able |
| 3 | HID1 | 8 | 530-610 | 2 | Good | Good |
| 4 | HID1 | 8 | 490-570 | 2 | Slightly good | Good |
| 5 | HID1 | 8 | 530-580 | 1 | Able | Excellent |
| 6 | HID2 | 4 | 550-580 | 1 | Good | Good |
| 7 | LED | 2 | 430-500 | 1 | Good | Good |
| *8 | HID1 | 8 | — | 0 | Disable | Excellent |

Symbol "*" indicates a sample outside the scope of the invention

According to the results in Table 1, in Sample 8 where the optical band elimination filter was not used, it was impossible to confirm the obstacle due to halation. In Sample 1 where all signals in the visible light region were cut, it was impossible to confirm the white line due to difficulty in confirming the vicinity of the vehicle.

Conversely, Samples 2 to 7 where the optical band elimination filter blocking only a part of a plurality of peaks was provided, it was possible to recognize the obstacle, and to recognize the white line.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

The invention claimed is:

1. A night vision apparatus, comprising:
   an illuminating device having one light source or two or more light sources, to emit light ranging from a visible light region to an infrared light region, a plurality of peaks existing in a wavelength spectrum in the visible light region;
   an imaging camera that receives light emitted from the illuminating device; and
   an optical band elimination filter that blocks only a part of peaks among the plurality of peaks,
   wherein an output image is obtained based on an image captured by the imaging camera through the optical band elimination filter.

2. The night vision apparatus of claim 1, wherein a number of the peaks is at least three, and the optical band elimination filter cuts only a peak having a highest intensity among the at least three peaks.

3. The night vision apparatus of claim 1, wherein a number of the peaks is at least three, and the optical band elimination filter cuts only a peak having a highest intensity and a peak having a second highest intensity among the at least three peaks.

4. The night vision apparatus of claim 1, wherein the light sources comprise a high intensity discharge lamp and a halogen lamp.

5. The night vision apparatus of claim 4, wherein a light-blocking band of the optical band elimination filter has a half maximum of a blocking ratio in a wavelength band of 490 to 570 nm.

6. The night vision apparatus of claim 5, wherein a light-blocking band width of the optical band elimination filter is 50 to 100 nm.

7. The night vision apparatus of claim 4, wherein a light-blocking band of the optical band elimination filter has a half maximum of a blocking ratio in a wavelength band of 530 to 610 nm.

8. The night vision apparatus of claim 1, wherein the optical band elimination filter has two light-blocking bands that differ in cutoff wavelength, which is a wavelength at which a blocking ratio is a half maximum.

9. A vehicle equipped with a night vision apparatus, in which the night vision apparatus of claim 1 is equipped.

10. A small boat equipped with a night vision apparatus, in which the night vision apparatus of claim 1 is equipped.

* * * * *